(12) United States Patent
Stegmaier

(10) Patent No.: US 7,610,687 B2
(45) Date of Patent: Nov. 3, 2009

(54) METHOD AND ROTATING LASER FOR DETERMINING AN ITEM OF ATTITUDE INFORMATION OF AT LEAST ONE OBJECT

(75) Inventor: Peter A. Stegmaier, Uetikon a/S (CH)

(73) Assignee: Leica Geosystems AG, Heerbrugg (CH)

( * ) Notice: Subject to any disclaimer, the term of this patent is extended or adjusted under 35 U.S.C. 154(b) by 40 days.

(21) Appl. No.: 11/722,445

(22) PCT Filed: Dec. 28, 2005

(86) PCT No.: PCT/EP2005/057203
§ 371 (c)(1),
(2), (4) Date: Jan. 4, 2008

(87) PCT Pub. No.: WO2006/070009
PCT Pub. Date: Jul. 6, 2006

(65) Prior Publication Data
US 2008/0244920 A1  Oct. 9, 2008

(30) Foreign Application Priority Data
Dec. 28, 2004  (EP) ................... 04030884

(51) Int. Cl.
*G01C 15/02* (2006.01)
(52) U.S. Cl. .......................................... 33/285; 33/290
(58) Field of Classification Search ............... 33/281, 33/282, 285, 290, 293; 356/3.01, 3.02
See application file for complete search history.

(56) References Cited

U.S. PATENT DOCUMENTS

| | | | |
|---|---|---|---|
| 3,687,556 A | 8/1972 | Price et al. | |
| 4,309,758 A | 1/1982 | Halsall et al. | |
| 4,807,131 A | 2/1989 | Clegg | |
| 5,600,436 A | 2/1997 | Gudat et al. | |
| 5,983,511 A * | 11/1999 | Osaragi et al. | ................. 33/293 |
| 6,052,181 A | 4/2000 | Maynard et al. | |
| 6,171,018 B1 | 1/2001 | Ohtomo et al. | |
| 6,324,455 B1 | 11/2001 | Jackson | |
| 7,168,174 B2 * | 1/2007 | Piekutowski | ................. 33/290 |
| 2003/0137658 A1 | 7/2003 | Ohtomo et al. | |
| 2004/0078137 A1 | 4/2004 | Breakfield et al. | |
| 2008/0212065 A1 * | 9/2008 | Konetschny et al. | ....... 356/3.01 |

FOREIGN PATENT DOCUMENTS

| | | |
|---|---|---|
| DE | 31 07 674 | 9/1982 |
| DE | 35 26 564 | 2/1987 |

(Continued)

*Primary Examiner*—G. Bradley Bennett
(74) *Attorney, Agent, or Firm*—Workman Nydegger

(57) ABSTRACT

The invention relates to both a method for determining the horizontal position of an object which is to be oriented toward a height reference plane in a highly precise manner; while using at least one rotating laser, as well as to the rotating laser itself. The rotating laser comprises a rotating unit, a laser source for emitting a laser radiation into a rotating, horizontal direction of emission, and means for affecting at least one radiation parameter of the laser radiation with an item of angle-dependent information from which the direction of emission can be derived so that the direction of emission is associated with the direction from the rotating laser toward the object that receives the laser radiation.

11 Claims, 7 Drawing Sheets

FOREIGN PATENT DOCUMENTS

| | | |
|---|---|---|
| DE | 197 55 324 | 6/1999 |
| DE | 199 40 404 | 3/2001 |
| EP | 0 744 494 | 11/1996 |
| EP | 0 811 727 | 12/1997 |
| JP | 06 059725 | 6/1994 |

* cited by examiner

METHOD AND ROTATING LASER FOR DETERMINING AN ITEM OF ATTITUDE INFORMATION OF AT LEAST ONE OBJECT

The invention relates to a method for determining an item of horizontal attitude information of at least one object with the use of at least one rotating laser, and a rotating laser for emitting laser radiation in a rotating emission direction.

By the introduction of highly efficient earth movers and levelling machines designed for the highest performances, considerable progress has been made in recent decades with regard to the speed of work in the area of road building and civil engineering, land development and open cast mining. By means of modern position determination techniques, it is also possible to achieve very high accuracies when working, in combination with a high degree of automation and deployment of few personnel. By means of automated methods, the mobile work machines follow a computer-generated theoretical contour by a procedure in which the respective actual positions of the mobile work machines are compared with the theoretical positions which arise from the computer-generated theoretical model, and appropriate interactions are triggered. In addition to level surfaces, any desired uneven contours can therefore also be produced. A substantial component here is the position determination technique of the individual work machines.

A possible, modern technique for relatively accurate determination of the position of a mobile work machine comprises satellite position determination systems, such as, for example, the GPS system. For this purpose, a GPS receiving unit is mounted on the mobile work machine, with the result that the absolute position of the work machine can be determined with an accuracy of a few meters. Since this accuracy is as a rule insufficient, methods long known from the GPS technique are used for increasing the positional accuracy, such as, for example, differential GPS, RTK or RTCM. In these methods, correction values are transmitted directly or indirectly, for example from a reference station, which correction values reproduce those errors in the satellite signals which are due in particular to refraction in the ionosphere and troposphere and are specific to the receiving location. By simultaneous reception of the satellite signals containing errors and the correction values transmitted by the near-by reference station by the GPS receiving unit mounted on the mobile work machine, position determination with centimetre accuracy is possible.

However, a system-related problem of the GPS technique is that the accuracy of the measurement in the vertical direction is lower than the accuracy of measurement in the horizontal direction. Since, however, as a rule, in particular in the area of road construction, the requirements regarding the processing accuracy in the vertical direction are greater than those regarding the processing accuracy in the horizontal direction, since undesired irregularities and waviness are to be avoided in any case, the use of GPS position determination systems alone is often insufficient. Moreover, there must always be visual contact with at least three, preferably at least four, satellites for position determination via GPS, which, however, is not always the case, especially when working under bridges or in narrow rows of houses or owing to other shading.

A further problem of the GPS technique is in particular that, although positions can be determined by means of GPS, the orientation of a work machine—in particular the azimuthal orientation—can be derived only from a change of position when only a single GPS receiver is used in each case. Consequently, either a plurality of GPS receivers at horizontally spaced points on a work machine or additionally orientation sensors, such as, for example, gyro systems or magnetic compass systems have to be used, which, however, are susceptible to stray magnetic fields.

Consequently, in spite of the existence of modern satellite position determination systems, it is not possible to dispense with the use of high-precision optical measuring methods, as are known from geodesy, in the case of corresponding requirements regarding the accuracy.

Rotating laser systems which produce a laser beam rotating substantially in the horizontal plane have been used for a relatively long time for exact regulation of the working height of mobile work machines. These produce a flat quasi-laser disc which defines a theoretical plane for at least one mobile work machine. The rotating laser beam is received by a receiver which is mounted on the work machine, for example, of a plurality of vertically distributed detectors and is optionally adjustable in height, with the result that an item of height information can be obtained in a highly accurate manner. If the position, too, is desired, this is often additionally determined with the aid of GPS systems.

U.S. Pat. No. 4,807,131 discloses an earth levelling system in which a detector for receiving laser radiation which is emitted by a rotating laser positioned a distance away from the levelling machine and distance-measuring means for determining the horizontal positioning of the levelling machine relative to at least one reference point are arranged on a mobile levelling machine. Thus, it is possible to determine the actual position of the levelling machine vertically and horizontally with sufficient accuracy by using two different measuring systems. By means of a gyroscope, direction and position changes can be detected. The theoretical contour to be levelled is stored on a storage medium. The actual measured values are compared with theoretical values which are obtained from the stored theoretical contours. The deviations are shown on a display, in particular by graphic representation of the theoretical and the actual contour, and/or serve for regulating the drives of the levelling machine. A disadvantage of this system is the necessity of using at least two measuring systems in order to be able to control the vehicle both vertically and horizontally with sufficient accuracy.

DE 197 55 324 A1 describes a method and a device for measuring the position and the attitude of a travelling vehicle relative to an earth-fixed coordinate system. The vehicle has at least two wireless distance- and/or angle-measuring devices which are a distance apart and can be oriented relative to pre-selectable reference points of a reference path in adjacent terrain, which reference points are a distance apart and are measured in an earth-fixed coordinate system. The determination of the position is effected by triangulation. By a comparison of the determined actual position with a theoretical position which is obtained from a stored theoretical three-dimensional curve, vehicle control commands are calculated. A sufficiently precise determination of an item of height information is not possible by means of this method.

EP 0 744 494 A1 describes a road finishing system which is equipped with a profile measuring device for determining the waviness of the road paving relative to a reference plane by mechanical sensing of the surface and with a GPS unit for determining the horizontal position component. The reference plane is produced by an elongated carriage, so that the reference plane produced thereby corresponds to low-pass filtering of the sensed surface. However, the height control permitted thereby is likewise insufficient for the required accuracies. Furthermore, this method is suitable only for height regulation at substantially level substrates which can be sensed. Owing to the required elongated carriage, this sensing method is unsuitable, for example, for height control of a bucket wheel excavator on a building site.

DE 199 40 404 C2 discloses a method for the three-dimensional control of a construction machine with the use of a GPS signal and of an adjustable rotating laser with a stationary location. By reception of the GPS signal, the horizontal position coordinates of the moving construction machine are determined and a theoretical height of a work tool of the construction machine is coordinated with said position coordinates. For generating a height signal indicating the theoretical height of the work tool, the rotating laser is adjusted, for example, by tilting, according to the coordinated theoretical height. This makes it possible to control the work tool of the construction machine precisely as a function of the height signal. For carrying out this method, however, both optical and satellite-aided measuring methods must be used. In areas not covered by satellite, for example in tunnels, under bridges and in towns with narrow rows of houses, this method cannot be carried out owing to shading. A plurality of measuring methods has to be used for determining the orientation of the work machine.

US 2003/0137658 A1 describes a system for controlling a construction machine. A rotating laser emits at least two fan-shaped laser beams, which are rotated about an axis and diverge in a plane which is not formed by the horizontal. The inclination of the at least two fan-shaped laser beams is different. An optical sensor mounted on the construction machine serves for receiving the fan-shaped laser beams. The horizontal position determination is effected via a GPS receiver likewise arranged on the construction machine. By means of an arithmetic computing unit, a height signal is obtained from the time lag of the arrival of the at least two fan-shaped, vertically divergent laser beams at the optical sensor. For carrying out this method, too, both optical and satellite-aided measuring methods have to be used in order to determine the position both horizontally and vertically with sufficient accuracy. In this method, too, satellite coverage is always required. Further measuring methods have to be used for determining the orientation.

U.S. Pat. No. 3,687,556 describes a position determination method and a corresponding device, in particular for position determination of a ship, aircraft, etc. Here, a fan-shaped beam, in particular a laser beam, which is narrowly focussed on the horizontal plane and is strongly divergent in the vertical plane is rotated about a vertical axis so that the beam can be received within a large, vertical area. An item of information reproducing the angle of rotation is superposed on the beam. An object whose horizontal position is to be determined has two receivers a distance apart, by means of which the beam can be received and the angle of rotation detected. From a knowledge of the respective received angle of rotation, the distance between the two receivers and the rotational speed, the horizontal position of the object is determined. By means of the method described, it is possible only to determine the horizontal position but not to obtain precise height information. A similar method is described in DE 35 26 564 A1.

DE 31 07 674 A1 describes a method for controlling the movement of objects with the aid of revolving, modulated laser beams which are emitted by one or more transmitters present at fixed reference points or on the object. The instantaneous angle of incidence and the desired trajectory of the object are transmitted with the laser beam. These items of information are recorded by a receiver present on the object, for determining the attitude of the object and for calculating the course correction. If the object is moved only on a plane, only a rotation of the laser beam in this plane is required. In the case of guidance of the object in three dimensions, a revolving, three-dimensional beam field is emitted, the transmitter rotating about two axes. In both cases, the transmitter moves stepwise and a laser beam of short duration which is modulated according to the items of information is emitted in each rest position. The laser beam thus serves as a medium for transmitting items of information, in particular position data. A disadvantage of the method described is the large interval of information transmission, since a large region of the laser beam has to be scanned three-dimensionally for orienting an object both in the horizontal direction and in the vertical direction.

U.S. Pat. No. 5,600,436 discloses a position determination system comprising a reference station which has rotating laser means for rotating a laser beam or two laser beams in a plane about the axis of rotation. It is stated that, in a possible embodiment, the laser beam contains a data signal which is linked to the angle of emission of the laser beam. For example, the amplitude or the frequency of the data signal is correspondingly modulated. Positioning means equipped with a detector serve for receiving the rotating laser beam and for detecting the angle of emission. By the use of a plurality of reference stations, the horizontal position of the positioning means can be determined via triangulation. In order also to be able to determine the height or z coordinate, positioning means which are equipped with a plurality of detectors offset with respect to height and receive the signal of a third reference station are described. The system outlined requires a multiplicity of reference stations. By means of the system described, it is not possible to determine the orientation of an object equipped with the positioning means, for example of a mobile work machine, so that it is necessary to rely on further sensory systems, in particular magnetic compass systems.

An object of the invention is therefore to provide an efficient, economical method and a device for accurate determination and/or control of the horizontal position and in particular of the horizontal orientation of an object oriented with high precision relative to a height reference surface, in particular a horizontal reference plane, for example of a mobile work machine, using as far as possible only a single measuring system.

A further object of the invention is to provide an additional measuring method and an additional measuring system for determining or for increasing the accuracy of an item of attitude information of a mobile work machine.

These objects are achieved by realising the characterizing features of the independent Claims. Features which further develop the invention in an alternative or advantageous manner are evident from the dependent Claims.

In the method for determining an item of attitude information of at least one object, a rotating laser comprising a rotating unit and a laser source for emitting laser radiation in a rotating emission direction is used according to the invention. The laser radiation has the form of a laser beam which diverges only slightly or not at all in its course in the vertical direction—i.e. in the height direction—and consequently is narrowly focussed and substantially parallel in the vertical direction. Thus, it is possible, as disclosed in the prior art—to define a highly precise reference surface or height reference surface in the vertical direction for the object by producing a quasi-laser surface. This quasi-laser surface can be formed by a planar quasi-laser disc or by appropriate control of the rotating laser through any desired conical surface. The laser radiation emitted by the rotating laser in the rotating, horizontal emission direction carries an item of angle-dependent information, from which the emission direction can be derived, so that the emission direction is linked to the direction from the rotating laser to the object which receives the laser radiation. The laser radiation may contain the angle-dependent information in different ways explained in more detail below. Thus, it is possible on the one hand to model on a carrier frequency of the laser radiation a signal from which the actual emission direction at the time of emission of the laser radiation can be derived. Moreover, a further radiation parameter of the laser radiation can be influenced so that the emission direction can be determined by appropriate evaluation of the laser radiation on reception. This can be effected, for example, by filtering, polarisation or intermitting as a function of the emission angle.

The laser radiation emitted by the rotating laser and containing the angle-dependent information is received by a detector of the object. From the received laser radiation, the emission direction is derived from the angle-dependent information so that the direction from the rotating laser to the object can be determined. By means of this direction information, optionally by carrying out further measurements— for example an additional optical distance measurement to the rotating laser or a determination of the detection direction—or by receiving a second laser radiation which is emitted by a second rotating laser, the attitude—i.e. the orientation and/or position—of the object relative to the at least one rotating laser can be determined precisely or the object can be controlled relative to the at least one rotating laser. There is no absolute necessity for communication to take place between the object and a system coordinated with the at least one rotating laser, in addition to the reception of the at least one laser radiation, or to use further measuring systems in addition to the rotating laser system. Thus, it is possible solely by reception of the laser radiation emitted by one or more rotating lasers—in particular by triangulation—to determine both the horizontal position at the place of reception relative to the position of the at least one rotating laser and the orientation, in particular azimuthal orientation. However, it is of course possible to use the method together with satellite position determination methods, for example for obtaining further items of attitude information and optionally to increase the accuracy and reliability of the attitude determination through data redundancy. The method described is suitable both for determining the position of mobile work machines which are used, for example, in road construction, in levelling work, in land development, in open cast mining, in underground mining, in agriculture or in other areas and for determining the position of road vehicles, transport systems, or mobile handling systems, in the finishing area, in the construction area or for further applications in which positions of an object relative to a reference location are to be determined. A further advantage of the method according to the invention is the combination of generation of a reference plane with simultaneous transmission of attitude information. This is because, according to the invention, not only is a reference plane generated, with which highly accurate perpendicular orientation to this reference plane is possible, as disclosed in the prior art, in particular from rotating laser technology, but at the same time an item of attitude information in the form of the emission direction of the laser radiation is also transmitted by the laser radiation itself so that orientation within this plane is possible. The method according to the invention is therefore suitable in particular for position determination of levelling machines or road construction machines since, in these fields of use, the accuracy of the height information, which often has to be less than two centimetres, is of particular importance. With the method according to the invention, it is possible to combine the orientation relative to a reference plane which is generated by a rotating laser which orientation takes place in any case in numerous areas, with a simultaneous determination of the attitude, in particular of the orientation and/or the position, at the place of reception of the laser radiation. Thus, it may be possible to dispense with further measuring systems, such as GPS, magnetic compass systems or gyro systems. Of course, it is also possible to emit a divergent laser beam which has, for example, a conical or flat shape, in a rotating emission direction so that a flat quasi-reference surface with constant quasi-surface thickness is not produced. This is expedient, for example, if reception of the emitted laser radiation and hence of the emission direction is to be possible within a large region parallel to the axis of rotation of the rotating laser.

Within the scope of the invention, the vertical direction or the height is to be understood as meaning the perpendicular to the surface—in particular plane—defined by the rotating laser or the direction of the axis of rotation, and consequently the horizontal position is to be understood as meaning the two-dimensional position within this surface or plane. In contrast, the horizontal and vertical do not inevitably relate to the gravitation-oriented, absolute earth coordinate system, even if this may generally be the case in practice.

The rotating laser for the emission of laser radiation in a rotating emission direction has a laser source for producing the laser radiation and a rotating unit for producing the rotational movement. The rotating unit is operatively connected to the laser source in such a way that the emission of the radiation takes place in the rotating emission direction, with the result that a quasi-laser surface which may be in the form of a planar quasi-laser disc or, by appropriate control of the rotating laser, in the form of any desired conical surface is generated. Here, the emission takes place continuously through 360° or is limited to at least one segment. Thus, it is possible to limit the emission to segments, for example by means of an aperture, by switching off the laser source within a certain emission angle range or by targeted actuation of the rotating unit, for example by fanning-out of the laser radiation within an angle range. Such a limitation of the emission to a segment can be effected in particular when the freedom of movement of the receiving object is limited to a part-segment of the possible quasi-laser surface. In the context of this invention, rotation is therefore to be understood as meaning not necessarily a continuous rotation about an axis but optionally also the fan-shaped swivelling of the laser radiation in an emission angle range. The rotating laser according to the invention comprises means for associating at least one radiation parameter of the laser radiation with an item of angle-dependent information, from which the emission-direction can be derived. In a possible embodiment, the emission direction can be unambiguously derived from the angle-dependent information within the entire emission angle range. In an alternative embodiment, this unambiguous derivability is limited only to a plurality of segments of the entire emission angle range, for example to 0 to 180° and 180° to 360°, so that an unambiguous assignment of an emission direction is possible in each case within these ranges but the range itself cannot necessarily be directly determined. This is not critical particularly in applications in which the object moves only in one of the plurality of segments. By means of such a division into a plurality of emission angle ranges, it is possible, for example, to increase the accuracy of determination of the emission direction. The means for associating the at least one radiation parameter can be formed according to the invention, for example, by an annular optical filter or polarizer surrounding the rotating laser radiation, by an optical element present in the beam path or by a circuit coordinated with the laser source and emission direction detection means. In the latter case, the emission direction is detected via the emission direction detection means, which, for example, are in the form of an angle detector having an operative connection to the rotating unit, and at least one radiation parameter in the generation of the laser radiation by the laser source is associated with the angle-dependent information via the circuit. This is effected, for example, by modulating a signal onto a carrier frequency of the laser radiation. Alternatively, the information association takes place only after generation of the laser radiation, for example by means of an active modulator, e.g. an electrooptical modulator (EOM) or acoustooptical modulator (AOM). A suitable electrooptical modulator is, for example, a Pockel cell. Further EOMs and AOMs are disclosed in the prior art.

The method according to the invention and the device according to the invention are described in more detail purely by way of example below with reference to specific working examples shown schematically in the drawings, further advantages of the invention also being discussed. Specifically:

Figure 1:
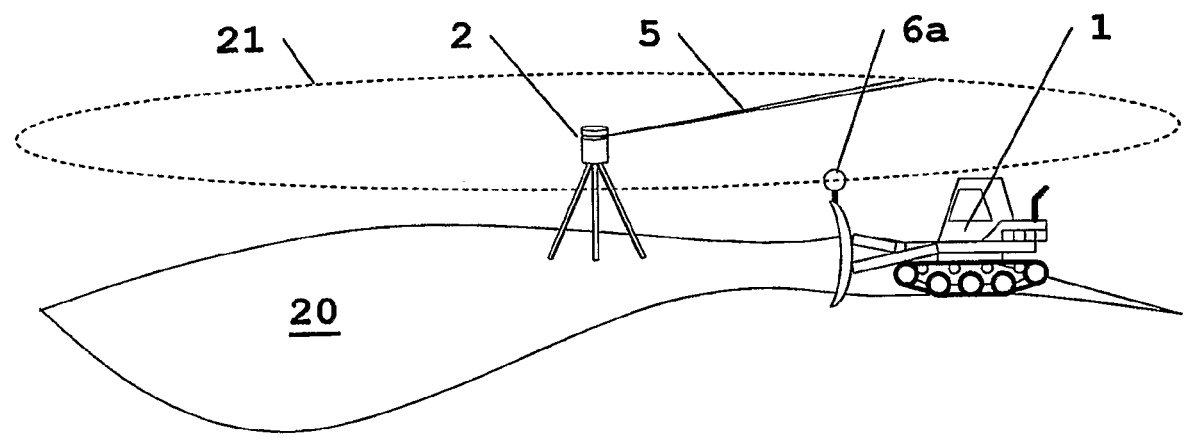
FIG. 1 shows, in a schematic diagram, a construction machine which receives an item of attitude information by reception, taking place via a first detector, of laser radiation emitted by a rotating laser.

FIG. 1 shows a building site 20 on which a rotating laser 2 for generating the rotating laser radiation 5 is erected at a reference point and oriented precisely relative to a superior coordinate system. By the rotation of the laser radiation 5, a quasi-laser plane 21 which serves as a height reference for the building site 20 is generated. An object in the form of a construction machine 1 on the building site 20 receives the laser radiation 5 briefly by means of a detector 6a as soon as said radiation passes over the detector 6a, provided that the detector 6a is present within the quasi-laser plane 21 formed by the rotating laser radiation 5. Since, in the example shown, the laser radiation 5 has a negligibly small divergence in the vertical direction, i.e. the beam path in the vertical direction is substantially parallel, it is possible to orient the construction machine 1—in particular a tool of the construction machine 1, such as, for example, a bucket—in the form of a highly precise height orientation of at least one component of the construction machine 1 by means of the laser radiation 5 exactly relative to the reference height. This method is disclosed in the prior art. In one possible embodiment, the detector 6a has a detection region extending in the direction perpendicular to the quasi-laser plane 21, within which region contact of the laser radiation 5 with the detector 6a can be detected, so that deviations from the reference height can be accurately detected. Optionally, the detector 6a is automatically adjustable in height in the perpendicular direction in order to avoid having to leave the quasi-laser plane even in the case of relatively large height differences and to avoid losing the height reference.

Figure 2:
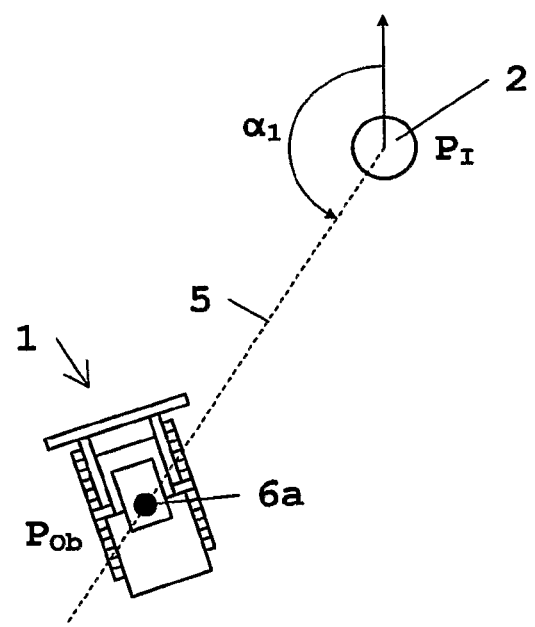
FIG. 2 shows a diagram illustrating the principle of deriving the direction of the rotating laser relative to the construction machine by deriving a first emission direction of the laser radiation.

A possible embodiment of the method is explained in FIG. 2 in a diagram illustrating the principle. A rotating laser 2 which is positioned in position $P_T$ emits laser radiation 5 in a rotating emission direction $\alpha_1$. In the diagram, the axis of rotation of the rotating laser 2 points to the zenith. Emission takes place in a horizontal plane. In the plan view, the rotation takes place in the counter-clockwise direction into the emission direction $\alpha_1$ thus rotating between 0° and 360°. The laser radiation 5 carries an item of angle-dependent information from which the respective emission direction $\alpha_1$ can be derived, the information association of the laser radiation being effected, for example, by modelling a signal onto a carrier frequency of the laser radiation. In the reception region of the laser radiation 5, an object in the form of a construction machine 1 is present in a position $P_{Ob}$. The laser radiation 5 emitted by the rotating laser 2 is received by a detector 6a which is arranged on the construction machine 1. The detector 6a is designed in such a way that the angle-dependent information from the laser radiation 5 is received and is processed in such a way that the first emission direction $\alpha_1$ is derived therefrom. From a knowledge of the orientation of the rotating laser 2 relative to a superior coordinate system, it is thus possible, in the position $P_{Ob}$, to determine the direction of the rotating laser 2 relative to the construction machine 1 without communication having to take place between $P_T$ and $P_{Ob}$ in addition to the pure reception of the laser radiation 5.

Figure 3:
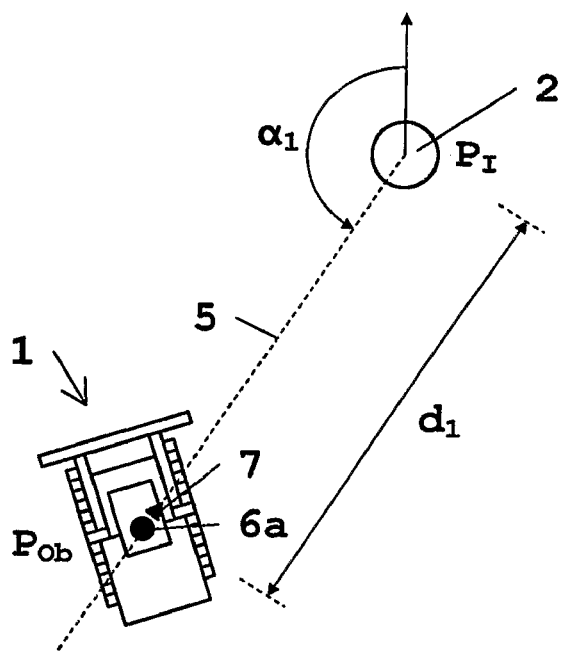
FIG. 3 shows a diagram illustrating the principle of deriving the position of a construction machine by additionally determining the distance.

In order to be able to determine the position $P_{Ob}$ of the construction machine 1 relative to the position $P_T$ of the rotating laser 2, the distance $d_1$ between the detector 6a and the rotating laser 2 is furthermore determined in a continuation of the method explained in FIG. 2, as shown in FIG. 3. In the example described, the distance measurement is effected by means of a laser rangefinder 7 arranged close to the detector 6a and present on the construction machine 1. The laser rangefinder 7 automatically measures to a point present on the rotating laser 2, with the result that the distance $d_1$ is determined. From a knowledge of the emission direction $\alpha_1$ and the distance $d_1$ between the detector 6a and the rotating laser 2, it is now possible to derive the position $P_{Ob}$ of the construction machine 1 relative to the position $P_T$ of the rotating laser 2, in particular by transformation of the polar coordinates $\alpha_1$ and $d_1$ into Cartesian coordinates. Of course, it is possible both to determine only the position of the constructive machine relative to the rotating laser 2 and to derive the absolute position $P_{Ob}$ of the construction machine from a knowledge of these relative positions on the construction machine 1 and the absolute position $P_T$ of the rotating laser 2. The same applies to the orientation of the construction machine 1.

Figure 4:
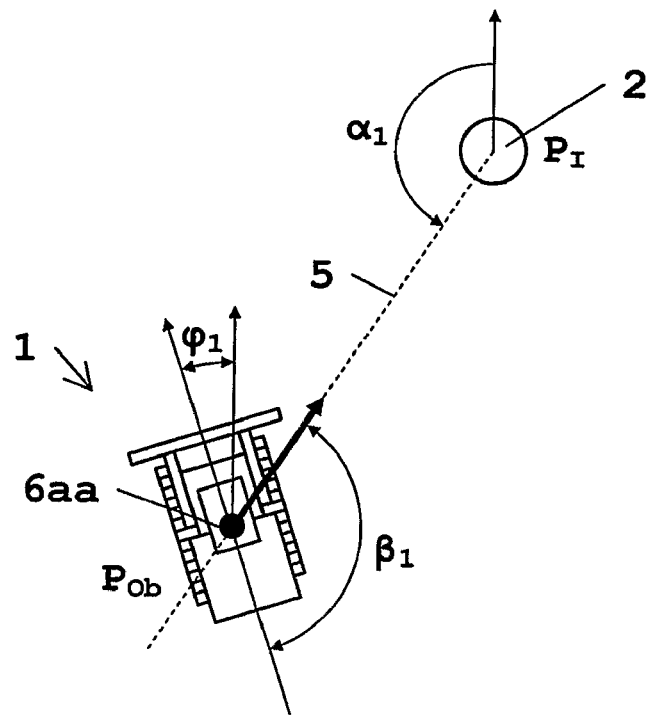
FIG. 4 shows a diagram illustrating the principle of deriving the orientation of the construction machine by additionally determining a first detection direction.

FIG. 4 explains, in a diagram illustrating the principle, the derivation of the orientation of the construction machine 1. As in FIG. 2, the rotating laser 2, which is positioned in position $P_T$, emits the laser radiation 5 in a rotating emission direction $\alpha_1$, which is received by a detector 6aa arranged on the construction machine 1. However, in comparison with the detector 6a from FIG. 2, the detector 6aa has an extended functionality which, in addition to the derivation of the emission direction $\alpha_1$, also permits a determination of the detection direction $\beta_1$ from which the laser radiation 5 arrives at the detector 6aa relative to the orientation of the construction machine 1. Such all-round detectors for receiving laser radiation with a receiving range of 0° to 360° and receiving angle detection are disclosed in the prior art. From a knowledge of the emission direction $\alpha_1$ and of the detection direction $\beta_1$, the orientation $\Phi_1$ of the construction machine 1 relative to the orientation of the rotating laser 2 can be derived by means of subtraction. Thus, it is possible to determine the azimuthal orientation of the construction machine 1 without the use of magnetic compass or gyro systems via the rotating laser 2.

Figure 5:
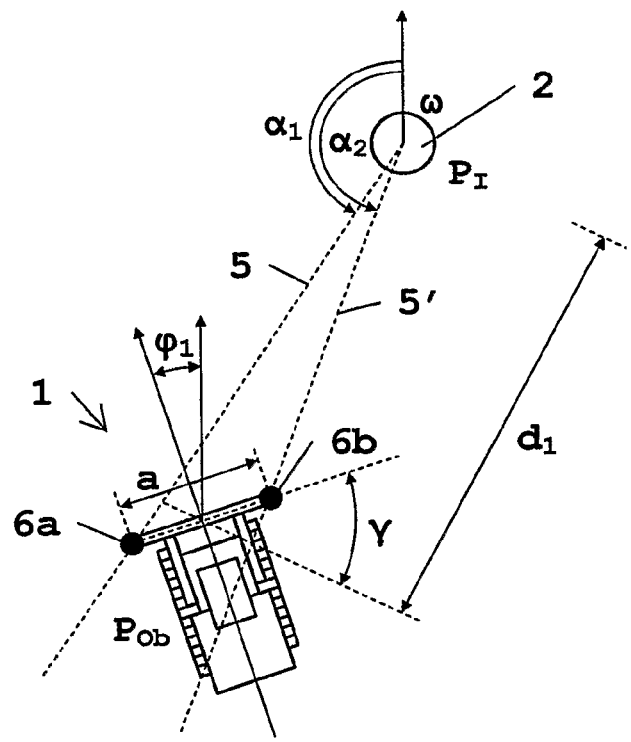
FIG. 5 shows a diagram illustrating the principle of deriving the distance or position of the construction machine by additionally deriving a second emission direction by means of a second detector.
Figure 6:
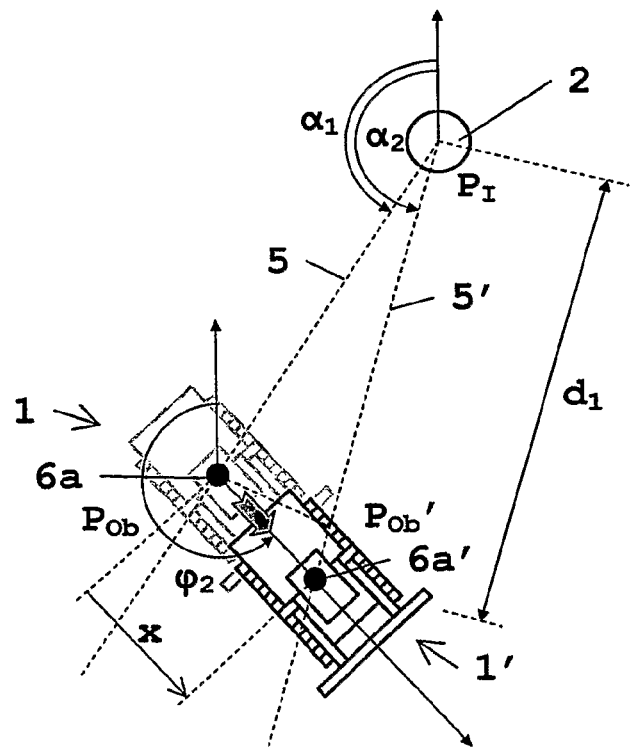
FIG. 6 shows a diagram illustrating the principle of deriving the distance or position of the construction machine by a defined change of the position of the first detector and additional derivation of a second emission direction.
Figure 7:
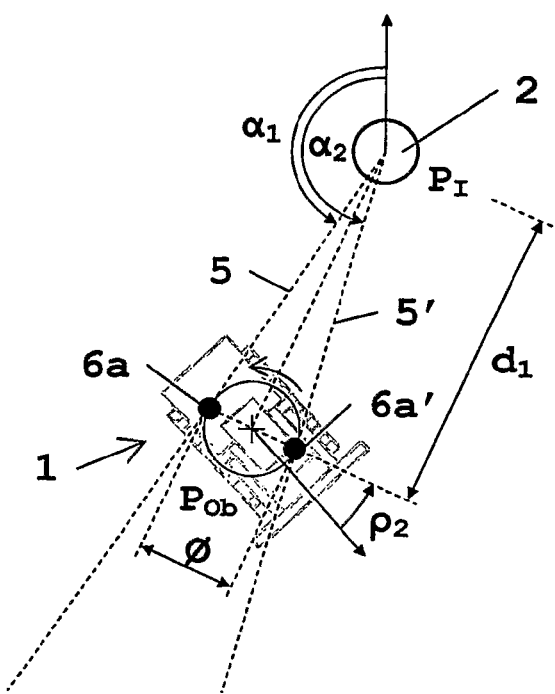
FIG. 7 shows a diagram illustrating the principle of deriving the distance or position of the construction machine by a defined change of the position of the first detector by rotation thereof.

While in the method shown in FIG. 3 a distance measurement by means of a separate laser rangefinder 7 is also effected in addition to the reception of the laser radiation 5 emitted by the rotating laser 2, FIGS. 5, 6 and 7 show methods by means of which, solely by reception of the laser radiation 5 emitted by the rotating laser 2 and containing angle-dependent information, the position $P_{Ob}$ and/or the distance of the construction machine 1 relative to the position $P_T$ of the rotating laser 2 is derived by a trigonometrical procedure by multiple reception of the laser radiation at different locations.

According to the invention, a second reception of the laser radiation 5' at the object 1, 1' at a horizontal distance defined relative to the position for the first reception of the laser radiation 5 is effected here. The first emission direction $\alpha_1$ of the laser radiation 5 received by the first detector 6a during the first reception and/or the second emission direction $\alpha_2$ of the laser radiation 5' received during the second reception are derived from the angle-dependent information. The distance $d_1$ or the horizontal position $P_{Ob}$, $P_{Ob}'$ of the object 1, 1' relative to the position $P_T$ of the rotating laser 2 is obtained from a knowledge of the first emission direction $\alpha_1$, of the second emission direction $\alpha_2$ and of the positional difference or the relative positional difference of the first reception to the second reception. This method is described in more detail below in FIG. 5 to 7.

FIG. 5 shows a rotating laser 2 which is placed in position $P_T$ and emits laser radiation 5, 5' in a rotating emission direction $\alpha_1$, $\alpha_2$ at a rotational velocity $\omega$. The laser radiation 5, 5' carries angle-dependent information from which the actual emission direction $\alpha_1$, $\alpha_2$ at the time of emission can be derived. The rotation of the laser radiation 5, 5' is effected, as above, about an axis of rotation pointing in the direction of the zenith, in a clockwise direction when viewed from above. A first detector 6a and a second detector 6b are arranged on a construction machine 1 in the position $P_{Ob}$ in the receiving range of the laser radiation 5, 5'. The detectors 6a and 6b have a known detector spacing a relative to one another. The height of the two detectors 6a and 6b is such that both detectors are located in the receiving range of the laser radiation 5, 5'. The detectors 6a and 6b are preferably at the same height, which, however, is not absolutely necessary in the case of a vertical divergence of the laser radiation 5, 5'. The detector orientation γ relative to the rotating laser 2, which is linked to the orientation $\phi_1$ of the construction machine 1, is likewise known. The orientation $\phi_1$ is obtained, for example, from detection of the receiving angle, as explained in FIG. 4, or from a measurement by means of magnetic compass or gyro system. Thus, the positional difference or the relative positional difference between the first detector 6a and the second detector 6b is known. In the example shown, the laser radiation 5, 5' first passes over the first detector 6a and shortly thereafter over the second detector 6b within one revolution of the rotating laser 2. First, the first detector 6a receives the laser radiation 5 emitted by the rotating laser 2, from which radiation a first emission direction $\alpha_1$ can be derived from the angle-dependent information. Shortly thereafter, the laser radiation 5' moved on by the rotation strikes the second detector 6b, so that a second emission direction $\alpha_2$ can be derived from the angle-dependent information. From a knowledge of the orientation $\phi_1$ of the construction machine 1 and hence of the detector orientation γ relative to the rotating laser 2, and of the detector spacing a, the perpendicular projection of the detector spacing a relative to the rotating laser 2 and, using the difference between the first emission direction $\alpha_1$ and the second emission direction $\alpha_2$, the distance $d_1$ between the construction machine 1 and the position $P_T$ of the rotating laser 2 can be derived by means of basic trigonometrical relationships. From a knowledge of the distance $d_1$ and the mean value of the first emission direction $\alpha_1$ and of the second emission direction $\alpha_2$, it is likewise possible to determine the position $P_{Ob}$ of the construction machine 1 relative to the position $P_T$ of the rotating laser 2.

In the example shown in FIG. 5, both the first emission direction $\alpha_1$ and the second emission direction 2 are derived from the angle-dependent information of the laser radiation 5, 5'. However, it is also possible to obtain only the first emission direction $\alpha_1$ from the angle-dependent information and to derive the second emission direction $\alpha_2$ by determination of a time difference $\Delta_t$ between the reception of the laser radiation 5 by the first detector 6a and the reception of the laser radiation 5' by the second detector 6b, or vice versa, and from a knowledge of the rotational velocity $\omega$ of the laser radiation and the first emission direction $\alpha_1$. Since, in this method, only one of the two detectors 6a or 6b need be equipped with means for deriving the emission direction $\alpha_1$ or $\alpha_2$, cost reductions can be achieved.

In the method explained in FIG. 5, two detectors 6a, 6b a distance apart are used. Alternatively, however, it is possible, according to the above-explained principle of the method, to use only a single detector whose position is changed in a defined manner between two reception times, instead of two detectors a distance apart. Two such methods are shown in FIG. 6 and FIG. 7. In both methods, a defined change in the position of the detector 6a of the construction machine 1 relative to its position during the first reception of the laser radiation 5 to a changed position is effected after a first reception of the laser radiation and a derivation of the first emission direction $\alpha_1$. Thereafter, the laser radiation 5' is received a second time by the same detector 6a', so that a second emission direction $\alpha_2$ of the laser radiation 5' received by the detector 6a' during the second reception is possible—in particular from the angle-dependent information. Thus, the distance $d_1$ or position $P_{Ob}$ of the construction machine 1 relative to the position $P_T$ of the rotating laser 2 can be derived from a knowledge of the first emission direction $\alpha_1$, of the second emission direction $\alpha_2$ and of the defined change in the position of the detector between the first reception and the second reception.

In FIG. 6, as in the working example from FIG. 5, laser radiation 5, 5' is emitted in a rotating emission direction by a rotating laser 2 placed in position $P_I$. In the position $P_{Ob}$ of a construction machine 1 having a single detector 6a, a first reception of the laser radiation 5 and a first derivation of a first emission direction $\alpha_1$ are effected. Thereafter, the position of the detector 6a of the construction machine 1 is changed relative to its position during the first reception of the laser radiation 5 by moving the entire construction machine 1, 1' through a known distance x to a known direction $\phi_2$ relative to the rotating laser 2 with a fixed position of the detector 6a, 6a' relative to the construction machine 1, 1'. In FIG. 6, the construction machine 1 and its detector 6a is shown shaded in the original position $P_{Ob}$, whereas the construction machine 1' with its detector 6a' is shown in black in the changed position $P_{Ob'}$. In the changed position $P_{Ob'}$ of the construction machine 1', the laser radiation 5' is received a second time, and a second emission direction $\alpha_2$ is determined from the angle-dependent information. From a knowledge of the distance x and the direction $\omega_2$ thereof, the perpendicular projection of the distance x relative to the direction to the rotating laser 2 is determined trigonometrically and, likewise using basic trigonometrical relationships, the distance $d_1$ or position $P_{Ob'}$ of the construction machine 1' relative to the position $P_T$ of the rotating laser 2 is derived therefrom.

A disadvantage of the methods explained in FIG. 5 and FIG. 6 is that the position cannot be determined in every orientation of the construction machine 1. If, in the working example of FIG. 5, the construction machine 1 is transverse to the receiving direction of the laser radiation 5, 5', both sensors 6a and 6b detect the arrival of the laser radiation at the same time, so that neither distance $d_1$ nor position $P_{Ob}$ can be derived trigonometrically. Said problem occurs in the working example FIG. 6 when the construction machine 1 is oriented in the direction of the laser radiation 5, 5' or in the opposite direction. Moreover, the method of FIG. 6 cannot be used for distance or position determination when the vehicle is stationary.

Figure 8:
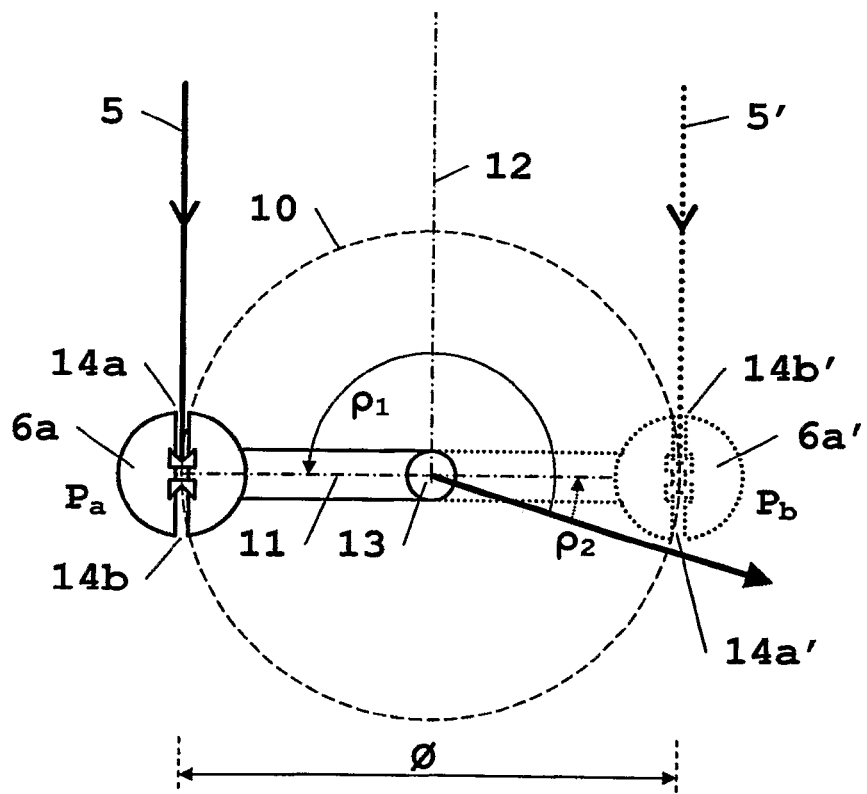
FIG. 8 shows, in a schematic diagram, the arrangement of a rotating detector having two diametrically opposed detection regions.

The working example shown in FIG. 7 solves these problems by a defined movement of a single detector 6a, 6a' in the case of a substantially fixed position $P_{Ob}$ of a construction machine 1. FIG. 8 shows, in a detailed view from FIG. 7, the arrangement of a rotating detector 6a on the construction machine 1. The detector 6a circles along a circular path 10 about an axis substantially parallel to the axis of rotation of the rotating laser 2. The circling detector 6a has two diametrically opposed detection regions 14a, 14b which permit reception of substantially only that laser radiation 5, 5' which is tangential to the circular path 10. Such a detector can be realised, for example, by limiting the detection region to an angle of incidence of exactly 0° and 180° at the detector. In a full revolution of the detector 6a, the detector 6a first receives the laser radiation 5 emitted at the emission angle $\alpha_1$ in the detection region 14a of the two diametrically opposite detection regions 14a and 14b in position $P_a$—shown by means of a solid line in FIG. 8—in the position $\rho_1$ on the circular path 10. After approximately half a further revolution of the detector 6a, 6a', it arrives at the position $P_b$ substantially diametrically opposite the first position $P_a$, in the position $\rho_2$—shown by means of broken lines in FIG. 8—for a second reception of the laser radiation 5' emitted at the emission angle $\alpha_2$ in the detection region 14b' of the two diametrically opposite detection regions 14a' and 14b'. The connecting line 11 between the two substantially diametrically opposite positions $P_a$, $P_b$ runs here perpendicularly to the connecting line 12 between the rotating laser 2 and the centre 13 of the circular path which is located on the parallel axis. The distance $d_1$ or position $P_{Ob}$ of the construction machine and optionally the orientation $\omega_2$ of the construction machine 1 relative to the rotating laser 2 can be derived from a knowledge of the first emission direction $\alpha_1$, the second emission direction $\alpha_2$, the diameter Ø of the circular path 10 and in particular the detection times and/or the positions $\rho_1$, $\rho_2$ of the detector 6a, 6a' during the first and second reception by a trigonometrical method. The positions $\rho_1$, $\rho_2$ of the detectors 6a, 6a' can be determined, for example, by means of an angle detector. At a constant rotational velocity, it is alternatively possible, in a known manner, to determine the positions $\rho_1$, $\rho_2$ of the detectors 6a, 6a' from the respective detection times.

It is also possible to use three detectors arranged on the vehicle in particular in the corners of a fixed horizontal equilateral triangle in order to avoid the impossibility of a trigonometrical determination of the position at certain positions of the vehicle. Owing to the triangular arrangement, at least two non-flush detectors are always in the range of sight of the rotating laser.

Figure 9:
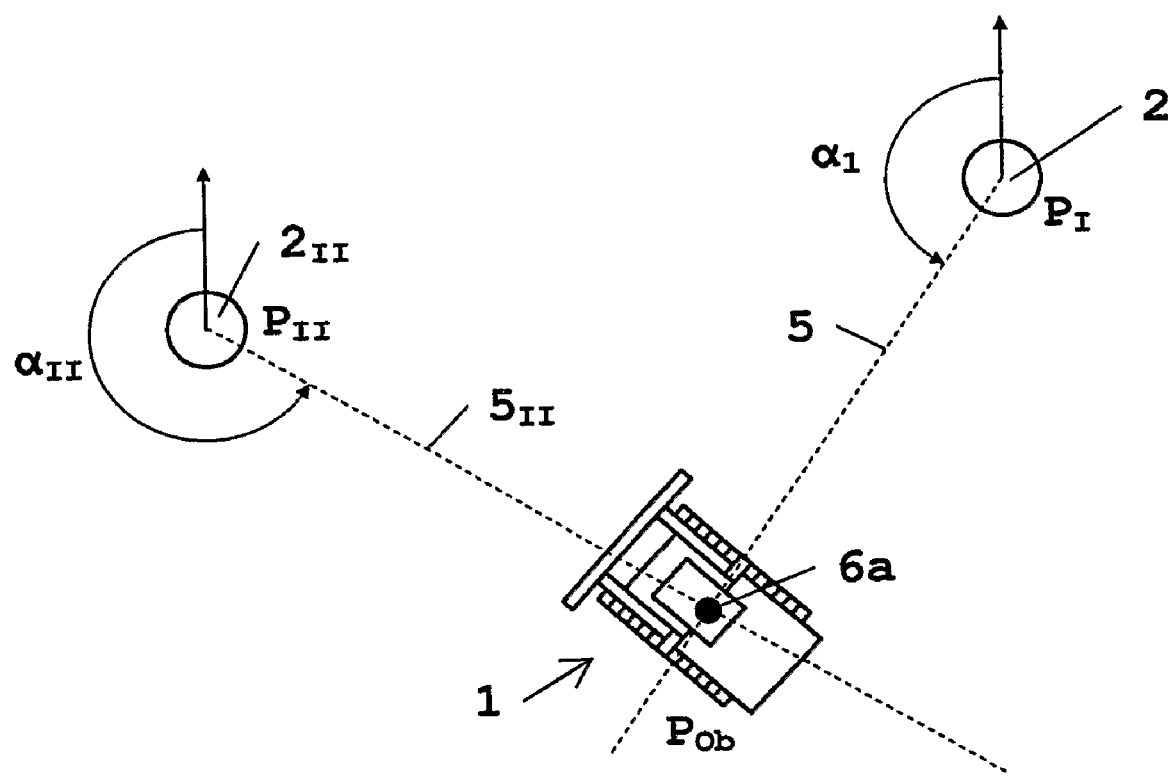
FIG. 9 shows a diagram illustrating the principle of deriving the distance or position of the construction machine by deriving a second emission direction of laser radiation of a second rotating laser.

While a single rotating laser is always used in the above working examples, a method comprising two rotating lasers a distance apart is described in FIG. 9. A first rotating laser 2 in the position $P_I$ and a further rotating laser $2_{TT}$ in the position $P_{TT}$ both emit in each case laser radiation 5 and $5_{II}$, respectively, in a rotating emission direction $\alpha_1$ and $\alpha_2$, respectively. Both laser radiations 5 and $5_{II}$ carry in each case an item of angle-dependent information from which the emission direction $\alpha_1$ and $\alpha_2$, respectively, can be derived, so that the emission direction $\alpha_1$ and $\alpha_2$, respectively, are linked to the two directions of the rotating laser 2 and $2_{II}$, respectively, to an object receiving the laser radiations 5 and $5_{II}$, a construction machine 1 in the example shown. The construction machine 1 present in the position $P_{Ob}$ has a detector 6a for receiving the laser radiations 5 and $5_{II}$ and for deriving the emission direction $\alpha_1$ and $\alpha_{TT}$, respectively. The association of the laser radiation with the angle-dependent information is effected, for example, by modelling signals onto a carrier frequency, for example the two carrier frequencies or the modelled-on signals of the two rotating lasers 2 and $2_{II}$ differing in that the two laser radiations 5 and $5_{II}$ can be associated by the detector 6a with the respective rotating laser 2 and $2_{II}$, respectively. From a knowledge of the first emission direction $\alpha_1$, the further emission direction $\alpha_{TT}$ and the positions $P_T$ and $P_{TT}$ of the two rotating lasers 2 and $2_{II}$, the derivation of the position $P_{Ob}$ of the construction machine relative to the two rotating lasers 2 and $2_{II}$ is effected by a trigonometrical method. The two rotating lasers 2 and $2_{II}$ are formed and oriented in such a way that the respective laser radiation 5 and $5_{II}$ can be received by the one detector 6a. Preferably, the two rotating laser radiations 5 and $5_{II}$ form a common quasi-laser plane as a height reference. Alternatively, by dispensing with the height reference, it is possible to use differently oriented rotating lasers 2 and $2_{TT}$ whose vertically strongly divergent laser radiations 5 and $5_{TT}$ respectively are received by a detector 6a. Of course, it is possible to combine the method variants described above with this method variant in which two rotating lasers are used, in order to avoid reception failures due to shading and to increase the accuracy of position determination.

Figure 10:
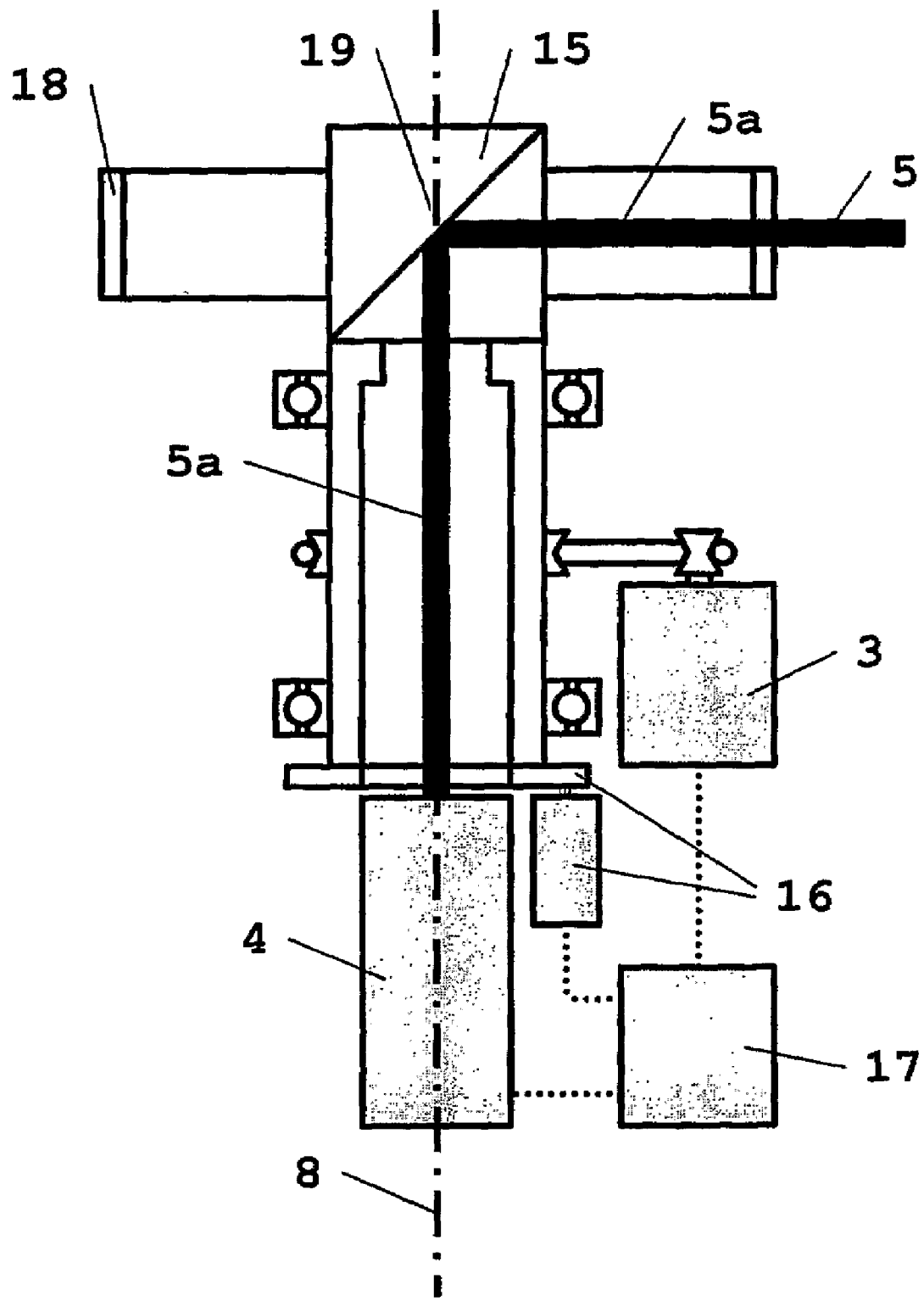
FIG. 10 shows a schematic diagram of a rotating laser having a circuit for associating a radiation parameter with an item of angle-dependent information.

FIG. 10 shows a rotating laser comprising a circuit for associating a radiation parameter with an item of angle-dependent information in a schematic diagram. The rotating laser for emission of laser radiation in a rotating emission direction comprises a laser source 4 for generating the laser radiation 5a. Different embodiments of laser sources, in particular diode lasers, are disclosed in the prior art. The laser radiation 5a strikes, in its beam path, a laser radiation deflecting unit 15 which deflects the laser beam 5*a* by 90° in the example shown. The laser radiation deflecting unit 15 is, for example, in the form of a mirror tilted 45° relative to the laser radiation 5*a*, preferably a Penta mirror which always deflects the laser radiation 5*a* by 90° independently of the angle of incidence. The laser radiation deflecting unit 15 has an operative connection to a rotating unit 3 in such a way that the laser radiation deflecting unit 15 can be rotated about an axis 8 of rotation by a motor drive. The rotating unit 3 is, for example, in the form of a sleeve which is mounted on ball bearings, surrounds the beam path of the laser radiation 5*a* and is driven by an electric motor by means of a belt drive. Thus, the emission of laser radiation 5, 5*a* is effected in a rotating emission direction 60 so that the quasi-laser plane 21 shown in FIG. 1 is produced. The point of intersection of this quasi-laser plane 21 with the axis 8 of rotation is defined as the centre 19 of rotation. The centre 19 of rotation is surrounded by a transparent exit window 18 so that the laser radiation 5*a* passes through the exit window 18 to the outside substantially without being affected at all, the laser radiation 5*a* produced being substantially equal to the laser radiation 5 which has passed through the exit window 18. Emission direction detection means in the form of an angle detector 16, which permit detection of the angular orientation of the laser radiation deflecting unit 15 and hence of the respective emission direction $\alpha$ of the laser radiation 5, are arranged indirectly on the rotating unit 3. Coordinated with the laser source 4 and the angle detector 16 is a circuit which is connected so that, on production of the laser radiation 5*a* by the laser source 4, at least one radiation parameter of the laser radiation 5*a* is associated with the angle-dependent information, from which the emission direction $\alpha$ can be derived. For example, depending on the position of the laser radiation deflecting unit 15 determined by means of the angle detector 16, a signal is modelled onto a carrier frequency of the laser radiation 5*a*, from which signal the emission direction $\alpha$ can be unambiguously derived. This signal is formed, for example, by two sine waves offset $\pi/2$ or a ramp. Preferably, the emission direction $\alpha$ is unambiguously derivable in the range from 0° to 360°. For some applications, however, it may be sufficient to permit the unambiguous assignment for an emission direction of, for example, only from 0° to 180° and from 180° to 360° in each case, the laser radiation, for example, at 90° being equal to that at 270°. For use in the area of attitude determination of mobile work machines, however, it is as a rule necessary to be able to unambiguously derive the emission direction $\alpha$ at least within a quadrant of the rotating emission direction from the angle-dependent information. Methods for modelling unique signals onto a carrier frequency of laser radiation are disclosed in the prior art, in particular optical data transmission. Alternatively or in addition, it is of course possible to connect the circuit 17 in such a way that, on production of the laser radiation 5*a* by the laser source 4, the laser radiation 5*a* is associated with the angle-dependent information by intermitting. Further methods for associating at least one radiation parameter of the laser radiation 5*a* during the production thereof with an item of angle-dependent information from which the emission direction $\alpha$ can be derived can of course also be realised within the scope of this invention.

Figure 11:
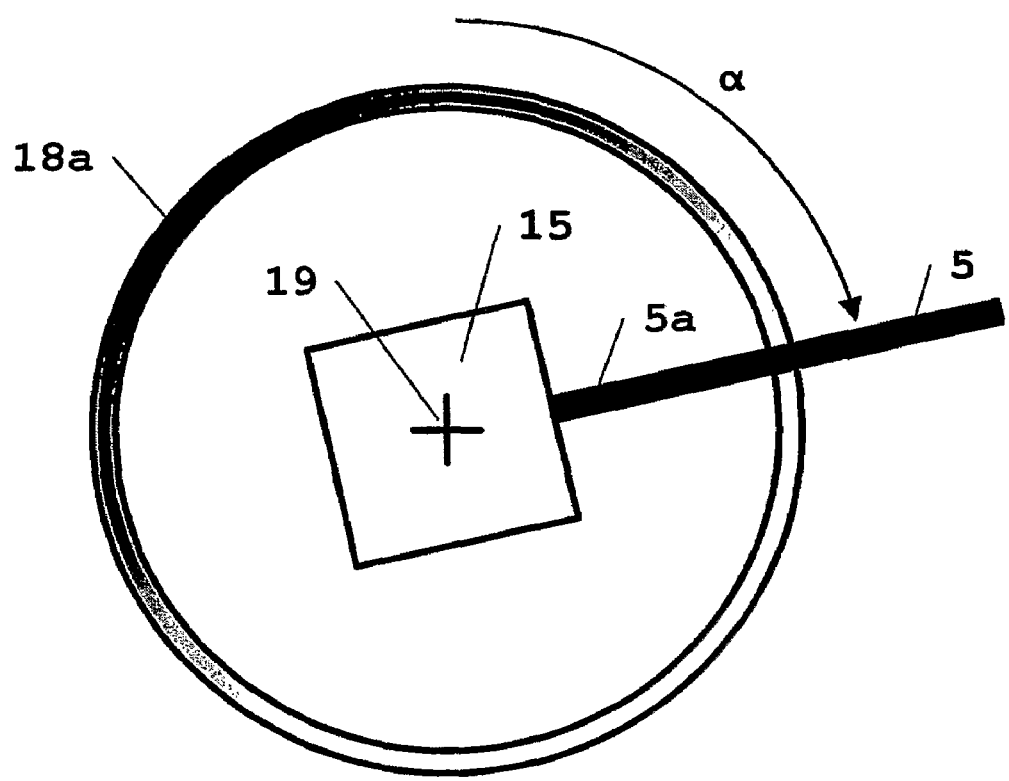
FIG. 11 shows a plan view of a rotating laser having an annular optical filter or polarizer with optical properties differing continuously along its annular circumference.

FIG. 11 shows a further embodiment of the rotating laser in a plan view. The rotating laser of FIG. 11 corresponds to the rotating laser in FIG. 10 with regard to the rotating unit 3 and the laser radiation deflecting unit 15. However, the rotating laser of FIG. 11 has no angle detector 16 for detecting the emission direction $\alpha$, with the result that the laser source produces continuous laser radiation 5*a* which carries no angle-dependent information. Instead, an annular optical filter or polarizer 18*a* is used instead of the exit window 18 from FIG. 10, which filter or polarizer surrounds the centre 19 of rotation of the rotating emission direction $\alpha$ in such a way that the laser radiation 5*a* passes through the filter or polarizer 18*a* with at least one radiation parameter being influenced and passed to the outside in the form of laser radiation 5. The filter or the polarizer 18*a* has, at least in one segment along its annular circumference, continuously differing optical properties so that the emission direction $\alpha$ can be derived from the laser radiation 5 from the influence on the at least one radiation parameter. Such a filter can be realised, for example, as a colour filter having transmission properties differing continuously along its annular circumference. From the spectral radiation distribution of the laser radiation 5 which is passed through the colour filter, it is thus possible to determine the emission direction $\alpha$. The polarizer can, for example, be in the form of a linear polarizer having polarization properties differing along its annular circumference, so that the emission direction $\alpha$ can be derived from the polarization direction of the laser radiation 5 which is passed through the polarizer.

Figure 12:
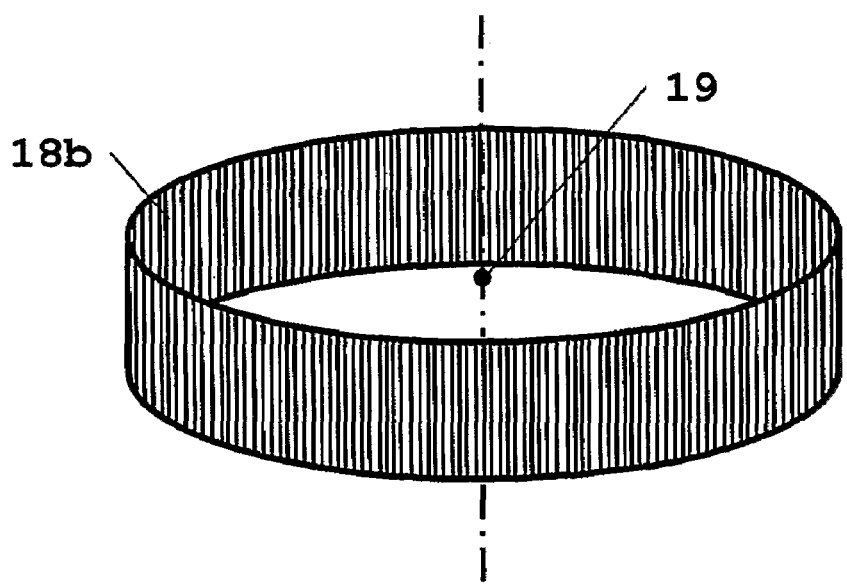
FIG. 12 shows an oblique view of an annular bar code carrier for intermitting the laser radiation as a function of the emission direction.

Instead of the filter or polarizer 18*a* or in addition thereto, however, an annular bar code carrier 18*b*, as shown in FIG. 12, can also be used for intermitting the laser radiation 5 as a function of the emission direction $\alpha$, which bar code carrier surrounds the centre 19 of rotation of the rotating emission direction in such a way that the laser radiation 5*a* passes through the bar code carrier in part-regions so that the emission direction $\alpha$ can be derived from the intermitting of the laser radiation 5. In this case, however, the detection of the laser radiation 5 must be effected within a certain angular range which permits a read out of the bar code on reception. This requires, for example, a large-area detector or a multiplicity of detectors arranged in series, for example a detector array, for receiving the laser radiation 5.

This invention claimed is:

1. A method for determining an item of horizontal attitude information of at least one object to be oriented highly precisely with respect to a height reference surface using at least one rotating laser, comprising a rotating unit and a laser source for emission of laser radiation substantially parallel in the vertical direction in a rotating, horizontal emission direction, so that the laser radiation defines a highly precise height reference surface for the object, the laser radiation carrying an item of angle-dependent information from which the emission direction can be derived, so that the emission direction is associated with the direction of the rotating laser to the object which receives the laser radiation, comprising the acts:

emission of the laser radiation by the rotating laser;

first reception of the laser radiation by a first detector of the object;

second reception of the laser radiation at the object in a defined horizontal position away from the position during the first reception of the laser radiation;

height orientation of at least one component of the object with the laser radiation;

derivation of a first emission direction of the laser radiation received by the first detector during the first reception and derivation of a second emission direction of the laser radiation received during the second reception, the derivation being effected at least once from the angle-dependent information; and derivation of the distance or horizontal position of the object relative to the position of the rotating laser from a knowledge of the first emission direction, of the second emission direction, and of the positional difference during the second reception relative to the first reception; wherein:

the second reception of the laser radiation is effected by the first detector;

in a preceding act to the second reception, a defined change in the position of the first detector of the object relative to its position during the first reception of the laser radiation to a changed position a defined horizontal distance away takes place; and the derivation of the distance or horizontal position of the object relative to the position of the rotating laser is effected from a knowledge of the first emission direction, of the second emission direction and of the defined change in the position of the first detector between the first reception, and the second reception.

2. A method according to claim 1, wherein the defined change of the position of the first detector of the object relative to its position during the first reception of the laser radiation to a changed position is effected by movement of the object by a known distance in a known direction relative to the rotating laser with the position of the first detector being fixed relative to the object.

3. A method according to claim 1, wherein the defined change of the position of the first detector of the object relative to its position during the first reception of the laser radiation to a changed position is effected by a defined movement of the first detector with substantially fixed position of the object.

4. A method according to claim 3, wherein the defined movement of the first detector with substantially fixed position of the object is effected in that the first detector of the object circles along a circular path about an axis substantially parallel to the axis of rotation of the rotating laser.

5. A method according to claim 4, wherein the position of the first detector on the circular path during the first reception of the laser radiation is substantially diametrically opposite the position of the first detector during the second reception, the connecting line of the two substantially diametrically opposite positions being perpendicular to the connecting line between the rotating laser and the centre of the circular path located on the parallel axis.

6. A method according to claim 4, wherein:

the circling first detector has two diametrically opposite detection regions which permit reception of substantially only that laser radiation which is tangential to the circular path; and the derivation of the distance or horizontal position of the object relative to the rotating laser is effected from a knowledge of the first emission direction, of the second emission direction, or of the diameter of the circular path.

7. A method according to claim 6, wherein the derivation of the distance or horizontal position of the object relative to the rotating laser is effected from a knowledge of the circular path, of the detection times, or of the positions of the first detector during the first and second reception.

8. A method for determining an item of horizontal attitude information of at least one object to be oriented highly precisely with respect to a height reference surface using at least one rotating laser, comprising a rotating unit and a laser source for emission of laser radiation substantially parallel in the vertical direction in a rotating, horizontal emission direction, so that the laser radiation defines a highly precise height reference surface for the object, the laser radiation carrying an item of angle-dependent information from which the emission direction can be derived, so that the emission direction is associated with the direction of the rotating laser to the object which receives the laser radiation, comprising the acts:

emission of the laser radiation by the rotating laser;

first reception of the laser radiation by a first detector of the object;

second reception of the laser radiation at the object in a defined horizontal position away from the position during the first reception of the laser radiation;

height orientation of at least one component of the object with the laser radiation;

derivation of a first emission direction of the laser radiation received by the first detector during the first reception and derivation of a second emission direction of the laser radiation received during the second reception, the derivation being effected at least once from the angle-dependent information;

derivation of the distance or horizontal position of the object relative to the position of the rotating laser from a knowledge of the first emission direction, of the second emission direction, and of the positional difference during the second reception relative to the first reception;

reception of the laser radiation of a further rotating laser a distance away from the rotating laser via the first detector of the object;

derivation of a further emission direction of the laser radiation of the further rotating laser received by the first detector; and derivation of the horizontal position of the object relative to the two rotating lasers from a knowledge of the first emission direction, of the further emission direction and of the positions of the two rotating lasers.

9. A rotating laser for the emission of laser radiation in a rotating emission direction, comprising:

a laser source for producing the laser radiation;

a rotating unit for producing a rotational movement, the rotating unit having an operative connection to the laser source such that the emission of the laser radiation is effected in the rotating emission direction; and means for associating at least one radiation parameter of the laser radiation with an item of angle-dependent information from which the emission direction are capable of being derived, wherein the means for associating at least one radiation parameter includes:

at least one annular optical filter or polarizer which surrounds the centre of rotation of the rotating emission direction so that the laser radiation passes through the filter or polarizer with influencing of at least one radiation parameter, the filter or the polarizer having continuously differing optical properties at least in one segment along its annular circumference so that the emission direction is capable of being derived from the influence on the at least one radiation parameter.

10. A rotating laser according to claim 9, wherein the means for associating at least one radiation parameter further includes at least one annular optical color filter which has transmission properties differing continuously at least in one segment along its annular circumference so that the emission direction can be derived from the spectral radiation distribution of the laser radiation which has passed through the color filter.

11. A rotating laser according to claim 9, wherein the means for associating at least one radiation parameter further includes at least one annular polarizer which has polarization properties differing continuously at least in one segment along its annular circumference so that the emission direction can be derived from the polarization direction of the laser radiation which has passed through the polarizer.

* * * * *